United States Patent
Zabih et al.

(10) Patent No.: US 6,744,923 B1
(45) Date of Patent: Jun. 1, 2004

(54) SYSTEM AND METHOD FOR FAST APPROXIMATE ENERGY MINIMIZATION VIA GRAPH CUTS

(75) Inventors: Ramin D. Zabih, New York, NY (US); Olga Veksler, Princeton, NJ (US); Yuri Boykov, Princeton, NJ (US)

(73) Assignee: Cornell Research Foundation, Inc., Ithaca, NY (US)

( * ) Notice: Subject to any disclaimer, the term of this patent is extended or adjusted under 35 U.S.C. 154(b) by 554 days.

(21) Appl. No.: 09/650,592

(22) Filed: Aug. 30, 2000

Related U.S. Application Data

(60) Provisional application No. 60/151,413, filed on Aug. 30, 1999.

(51) Int. Cl.$^7$ ............... G06K 9/70; G06K 9/00; G06K 9/34
(52) U.S. Cl. ............ 382/226; 382/154; 382/173
(58) Field of Search .................. 382/173, 180, 382/154, 107, 226, 224, 225; 345/419

(56) References Cited

U.S. PATENT DOCUMENTS 6,507,661 B1 * 1/2003 Roy ............... 382/107

OTHER PUBLICATIONS

H. Ishikawa and D. Geiger, "Occlusions, Discontinuities, and Epipolar Lines in Stereo", *European Conference on Computer Vision*, pp. 232–248, (1998).

D.M. Greig, B.T. Porteous, and A.H. Seheult, "Exact Maximum *A Posteriori* Estimation for Binary Images", *J.R. Statist. Soc. B*, vol. 51, No. 2, pp 271–279 (1989).

P. A. Ferrari, A. Frigessi, and P. Gonzaga de Sá, "Fast Approximate MAP Restoration of Multicolor Images", *J.R. Statist. Soc. B*, vol. 57, No. 3, pp 485–500 (1995).

\* cited by examiner

*Primary Examiner*—Vikkram Bali
(74) *Attorney, Agent, or Firm*—Perkins Smith & Cohen LLP; Jacob N. Erlich; Orlando Lopez

(57) ABSTRACT

Many tasks in computer vision involve assigning a label, such as disparity for depth of field data to every pixel. Energy minimization may be used to accomplish this labeling. The present invention provides an efficient way of minimizing energy functions in assigning labels to pixels. Two methods of using graph cuts to compute a local minimum are described. The first move is an $\alpha\beta$ swap. For a pair of labels, $\alpha$, $\beta$, this move swaps the labels between an arbitrary set of pixels labeled $\alpha$ and another arbitrary set of pixels labeled $\beta$. The first method generates a labeling such that there is no swap move that decreases the energy. The second move is the $\alpha$-expansion. For a label $\alpha$, this move assigns an arbitrary set of pixels with the label $\alpha$.

6 Claims, 11 Drawing Sheets

1. Start with an arbitrary labeling f
2. Set success := 0
3. For each pair of labels $\{\alpha,\beta\}\subset L$
    3.1. Find $\hat{f}$ = arg min E(f') among f' within one $\alpha$-$\beta$ swap of f.
    3.2. If E($\hat{f}$)<E(f), set f:=$\hat{f}$ and success :=1.
4. If success = 1 goto 2
5. Return

FIG. 1a

1. Start with an arbitrary labeling f
2. Set success := 0
3. For each label $\alpha \in L$
    3.1 Find $\hat{f}$ = arg min E(f') among f' within one $\alpha$-expansion of f
    3.2 If E($\hat{f}$) < E(f), set f:= $\hat{f}$ and success := 1.
4. If success = 1, goto 2
5. Return f

FIG. 1b

Property 4.2(a)  Property 4.2(b)  Property 4.2(c,d)

Figure 10: Real imagery with ground truth

| λ | % of total errors | %of errors > ±1 | Absolute average error |
|---|---|---|---|
| 1 | 26.6 | 4.5 | 0.40 |
| 5 | 13.0 | 4.5 | 0.27 |
| 10 | 7.0 | 2.3 | 0.15 |
| 20 | 7.6 | 2.1 | 0.15 |
| 30 | 7.9 | 2.3 | 0.17 |
| 50 | 8.8 | 2.3 | 0.18 |
| 100 | 10.4 | 2.9 | 0.21 |
| 500 | 16.3 | 8.2 | 0.37 |

(a) Left image  (b) Piecewise constant prior  (c) Piecewise smooth prior (a) First image  (b) Horizontal movement  (c) Vertical movement (a) First image  (b) Horizontal movement

SYSTEM AND METHOD FOR FAST APPROXIMATE ENERGY MINIMIZATION VIA GRAPH CUTS

CROSS-REFERENCE TO RELATED APPLICATIONS

This application claims priority of U.S. provisional applications Serial No. 60/151,413 entitled, "Fast Approximate Energy Minimization Via Graph Cuts" filed Aug. 30, 1999 by the present applicants.

STATEMENT OF GOVERNMENT INTEREST

This invention was partially funded by the Government under a grant from DARPA under contract DAAL01-97-K-0104, and by NSF awards CDA-9703470 and IIS-9900115. The Government has certain rights in portions of the invention.

FIELD OF THE INVENTION

This invention relates generally to computer vision and more particularly to minimizing energy functions in labeling pixels in early vision.

BACKGROUND OF THE INVENTION

In computer vision, early vision is usually considered to involve the description of geometric structure in an image or sequence of images. The behavioral constraints on real-time visual systems typically require that the early vision stage be fast, reliable, general and automatic. Many early vision problems require estimating some spatially varying quantity such as intensity or disparity, from noisy measurements.

Spatially varying quantities tend to be piecewise smooth, i.e. they vary smoothly at most points, but change dramatically at object boundaries. Every pixel in a set P must be assigned a label in some set L. For motion or stereo, the labels are disparities. For image restoration, the labels represent intensities. The goal is to find a labeling f that assigns each pixel $p \in P$ a label $f_p \in L$, where f is both piecewise smooth and consistent with observed data.

Computer vision problems can be formulated in terms of minimization of energy functions. Energy functions, however, are generally difficult to minimize. The major difficulty with energy minimization for computer vision lies in the enormous computational costs. Energy functions for computer vision typically have many local minima. Also, the space of possible labelings has the dimension |P| which is many thousands.

There have been many attempts to design fast algorithms for energy minimization. Due to the inefficiency of computing a global minimum, some solutions are directed instead at computing a local minimum. In general, a local minimum can be arbitrarily far from the optimum. It thus may not convey any of the global image properties that are encoded in the energy function. It is, however, difficult to determine the exact cause of an algorithmi's failures. When an algorithm gives unsatisfactory results, it may be due to either a poor choice of the energy function, or due to the fact that the answer is far form the global minimum. Local minimization techniques are also naturally sensitive to an initial estimate.

In general, a labeling f is a local minimum of the energy E if $$E(f) \leq E(f') \text{ for any } f' \text{ "near to" } f. \tag{1}$$

In case of discrete labeling, the labelings near to f are those that lie within a single move of f. Many local optimization techniques use standard moves, where only one pixel can change its label at a time. For standard moves, the equation above can be read as follows: if you are at a local minimum with respect to standard moves, then you cannot decrease the energy by changing a single pixel's label. In fact, this is a very weak condition. As a result, optimization schemes using standard moves frequently generate low quality solutions.

An example of a local method using standard moves is Iterated Conditional Modes (ICM). For each site (pixel or voxel), the label which gives the largest decrease of the energy function is chosen, until the iteration converges to a local minimum.

Another example of an algorithm using standard moves is simulated annealing. Simulated annealing randomly proposes some change in the state of the system. If the change results in a decrease of energy (which is equivalent to a decrease in cost in the more general sense of optimization), the change will always be taken. If it results in an increase in energy, it will be chosen using a probability scheme. At high temperatures (i.e. early in the simulated annealing process), changes of state that result in large increases in energy will be accepted with a higher probability than they would be at low temperatures (late in the simulated annealing process). Simulated annealing is widely used because it can optimize an arbitrary energy function. Minimizing an arbitrary energy function requires exponential time, and as a consequence simulated annealing is very slow.

Simulated annealing is inefficient partly because at each step, annealing changes the value of a single pixel. Theoretically, simulated annealing should eventually find the global minimum if it is run long enough. As a practical matter, it is necessary to decrease the algorithm's temperature parameter faster than required by the theoretically optimal schedule. Once annealing's temperature parameter is sufficiently low, the algorithm will converge to a local minimum with respect to standard moves.

An alternative method is to seek a local minimum using variational techniques, for example. Variational methods can be applied if the energy minimization problem is phrased in continuous terms. Variational techniques use Euler equations, which are guaranteed to hold at a local minimum. In continuous cases, the labels near to f in the equation above are normally defined as $\|f-f'\| \leq \epsilon$ where $\epsilon$ is a positive, constant and $\|\cdot\|$ is a norm, e.g. $L_2$ over some appropriate functional space. To apply these algorithms to actual imagery requires discretization.

Another alternative is to use discrete relaxation labeling methods. In relaxation labeling, combinatorial optimization is converted into continuous optimization with linear constraints. Then some form of gradient descent, which gives the solution satisfying the constraints, is used.

There are also methods that have optimality guarantees in certain cases. Continuation methods, such as graduated non-convexity are an example. These methods involve approximating an intractable (non-convex) energy function by a sequence of energy functions beginning with a tractable (convex) approximation. There are circumstances where these methods are known to compute the optimal solution. Continuation methods can be applied to a large number of energy functions, but except for special cases, nothing is known about the quality of their output.

Mean field annealing is another popular minimization approach. It is based on estimating the partition function from which the minimum of the energy can be deduced. Computing the partition function, however, is computationally intractable, and saddle point approximations are used.

There are a few interesting energy functions where the global minimum can be rapidly computed via dynamic programming. Dynamic programming, however, is restricted essentially to energy functions in one-dimensional settings. In general, the two-dimensional energy functions that arise in early vision cannot be solved efficiently via dynamic programming.

It is an object of the present invention to provide a method and apparatus to improve the early vision stage of computer vision.

It is another object of the present invention to provide a method and apparatus to improve the speed while maintaining accuracy of minimizing energy functions.

SUMMARY OF THE INVENTION

The problems of early vision and minimizing energy functions are solved by the present invention of a method and apparatus for fast approximate energy minimization via graph cuts.

Many tasks in computer vision involve assigning a label, such as disparity for depth of field data to every pixel. Energy minimization may be used to accomplish this labeling. The present invention provides an efficient way of minimizing energy functions in assigning labels to pixels.

The major restriction is that the energy function's smoothness term must involve only pairs of pixels. Two methods of using graph cuts to compute a local minimum are described. They may be used even when very large moves are allowed.

The first move is an α-β swap. For a pair of labels, α, β, this move swaps the labels between an arbitrary set of pixels labeled a and another arbitrary set of pixels labeled β.

The first method generates a labeling such that there is no swap move that decreases the energy.

The second move is the α-expansion. For a label α, this move assigns an arbitrary set of pixels with the label α.

The second method which requires the smoothnes term to be a metric, generates a labeling such that there is no expansion move that decreases the energy.

The present invention together with the above and other advantages may best be understood from the following detailed description of the embodiments of the invention illustrated in the drawings, wherein:

BRIEF DESCRIPTION OF THE DRAWINGS

FIG. 1a is a first algorithm for approximate minimization of energy functions as applied to early vision according to principles of the invention;

FIG. 1b is a second algorithm for approximate minimization of energy functions according to principles of the invention;

FIG. 4 is a flow chart of the operation of the α-β swap method of FIG. 1a;

FIG. 14a is a first image of a motion sequence where a cat moves against a moving background;

FIG. 14b shows the horizontal motions detected with the swap algorithm of the present invention in FIG. 14a;

FIG. 14c shows the vertical motions detected with the swap algorithm of the present invention in FIG. 14a;

DETAILED DESCRIPTION OF PREFERRED EMBODIMENTS

Figure 2:
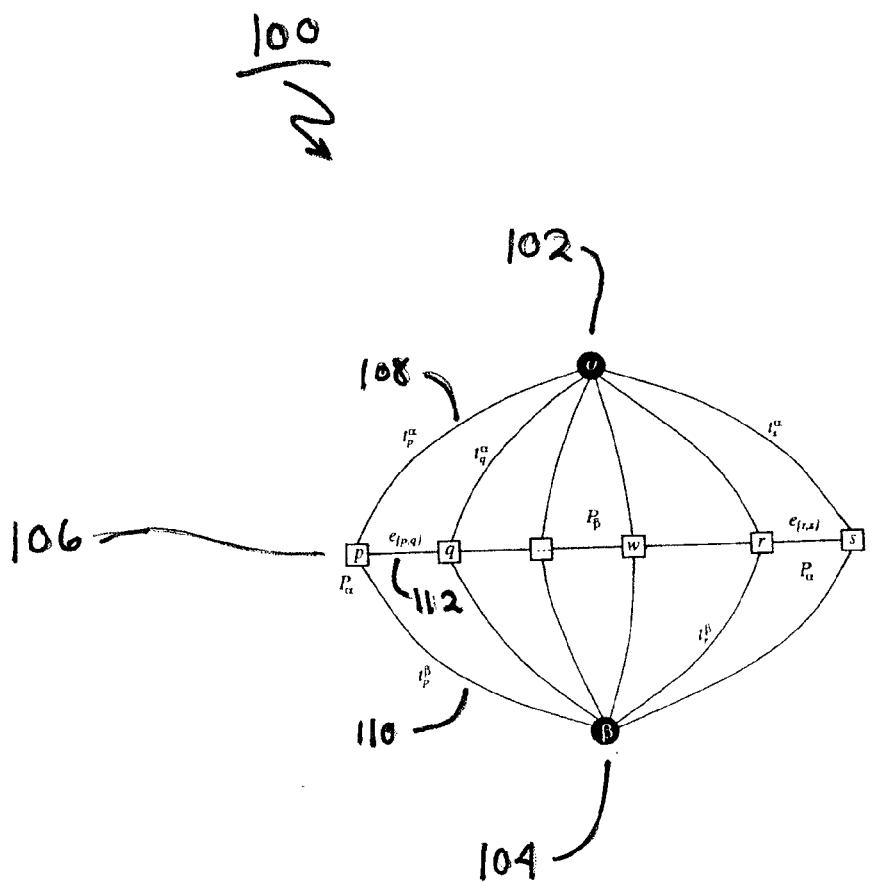
FIG. 2 is a graph system for the α-β swap method according to principles of the invention.

FIGS. 1a and 1b are energy minimization functions of the present invention. Computer vision problems can be formulated in terms of energy minimization. The goal is to find solutions that are smooth over the surface of objects in a view but these solutions must also preserve sharp discontinuities at, for example, object boundaries.

In the algorithms of the present invention, an arbitrary initial solution is assumed. The initial solution may be completely arbitrary or it could be some less accurate solution to the computer vision problem then the present invention.

Energy functions are difficult and slow to solve. Approximate solutions provide good results in a reasonable period of time. The algorithms of the present invention provide approximate solutions with provable qualities. The algorithms of the present invention use graph cuts to obtain solutions. Each pixel in the view is a node. The graph can be thought of as a net and on the net are nodes and strings that connect the nodes. In a preferred embodiment of the invention, nodes are connected to neighboring nodes immediately above, below, to the right and to the left. The lines connecting the nodes represent the relationship between the nodes. In graph terminology, these lines are also referred to as "edges." Each line belongs to a distinct pair of pixels. This node and line system is also referred to as the "neighborhood system." In alternative embodiments of the invention, the graph could have diagonal links between nodes in addition to the links described above or instead of those links. Nodes could also be connected in ways other than to direct neighbors. Many types of neighborhood systems are possible and the invention is not limited to the neighborhood systems described herein.

$V_{p,q}$ represents how pixels act within a pair of pixels. It is desirable for the difference between interacting pixels to be as small as possible. $V_{p,q}$ can also be thought of as a penalty for discontinuity between pixels. The present system puts restrictions on $V_{p,q}$. $V_{p,q}$ must be non-negative but it can be different for different pixel pairs. The penalties and restrictions are also part of the neighborhood system.

The input to the algorithms then is the neighborhood system, i.e. nodes, edges, penalty functions and assumptions.

The goal is to find a labeling f that minimizes the energy $$E(f) = E_{smooth}(f) + E_{data}(f) \quad (2)$$

where $E_{smooth}$ measures the extent to which f is not piecewise smooth, and $E_{data}$ measures the disagreement between f and the observed data. The form of $E_{data}$ measures the disagreement between f and the observed data. The form of $E_{data}$ is typically, $$E_{data}(f) = \sum_{p \in P} D_p(f_p) \quad (3)$$

where $D_p$ measures how appropriate a label is for the pixel p given the observed data. In image restoration, for example, $D_p(f_p)$ is typically $(f_p - i_p)$, where $i_p$ is the observed intensity of the pixel p.

The choice of $E_{smooth}$ is important. There are many potential choices. For example, in regularization-based vision, $E_{smooth}$ makes f smooth everywhere. This gives poor results at object boundaries in general. Energy functions that do not have this problem are called discontinuity-preserving.

The major difficulty with energy minimization for early vision lies in the enormous computational costs. Typically these energy functions have many local minimums (i.e. they are non-convex). Also, the space of the possible labelings has dimension |P|, which is many thousands.

The energy functions used in the present invention are of the form, $$E(f) = \sum_{\{p,q\} \in N} V_{p,q}(f_p, f_q) + \sum_{p \in P} D_p(f_p) \quad (4)$$

where N is the set of interacting pairs of pixels. Typically N consists of adjacent pixels, but it can be arbitrary. $D_p$ is nonnegative but otherwise arbitrary. Only pairs of pixels interact directly in $E_{smooth}$. Each pair of pixels (p,q) can have its own distinct interaction penalty $V_{p,q}$ independent of any other pair of interacting pixels. To simplify notation, $V_{p,q}$ will be written as V.

The methods of the present invention approximately minimize the energy E(f) for an arbitrary finite set of labels L under two fairly general classes of interaction penalty V: metric and semi-metric: V is called a metric on the space of labels L if it satisfies:

$$V(\alpha, \beta) = 0 \Leftrightarrow \alpha = \beta \quad (5)$$

$$V(\alpha, \beta) = V(\alpha, \beta) \geq 0 \quad (6)$$

$$V(\alpha, \beta) \leq V(\alpha, \gamma) + V(\beta, \gamma) \quad (7)$$

for any labels $\alpha, \beta, \gamma \in L$. If V does not satisfy the triangle inequality of equation (7), it is called semi-metric.

Both semi-metrics and metrics include important cases of discontinuity preserving interaction penalties. A penalty V is discontinuity preserving if it is bounded, i.e. $\sup_{(x,y) \in R^2} V(x, y) < \infty$. Examples of such interaction penalties for a one-dimensional label set L include the truncated quadratic $V(\alpha, \beta) = \min(K, |\alpha - \beta|^2)$ (a semi-metric) and the truncated absolute distance $V(\alpha, \beta) = \min(K, |\alpha - \beta|)$ (a metric), where K is some constant. If L is multidimensional, |•| can be replaced by any norm. Another important discontinuity preserving interaction penalty is given by the Potts model $V(\alpha, \beta) = K \cdot T$ ($\alpha \neq \beta$) (a metric), where T(•) is 1 if its argument is true, and otherwise 0.

The methods of the present invention generate a local minimum with respect to very large moves, i.e. more than one pixel at a time. The algorithms generate a labeling that is a local minimum of the energy for two types of large moves: $\alpha$-expansion and $\alpha$-$\beta$-swap. In contrast to the standard moves described above in the Background of the Invention, these moves allow large numbers of pixels to change their labels simultaneously. This makes the set of labelings within a single move of a locally optimal f exponentially large. For example, $\alpha$-expansion moves are so strong that any labeling locally optimal with respect to these moves are within a known factor of the global minimum.

Any labeling f can be uniquely represented by a partition of image pixels $P = \{P_l | l \in L\}$ where $P_l = \{p \in P | f_p = l\}$ is a subset of pixels assigned label l. Since there is an obvious one to one correspondence between labelings f and partitions P, these notions will be used interchangingly.

Given a pair of labels $\alpha, \beta$, a move from a partition P (labeling f) to a new partition P' (labeling f') is called an $\alpha$-$\beta$ swap if $P_l = P'_l$ for any label $l \neq \alpha, \beta$. This means that the only difference between P and P' is that some pixels that were labeled $\alpha$ in P are labeled a in P'. A special case of an $\alpha$-$\beta$ swap is a move that gives the label $\alpha$ to some set of pixels that used to be labeled $\beta$.

Given a label $\alpha$, a move from a partition P (labeling f) to a new partition P' (labeling f') is called an $\alpha$-expansion if $P_\alpha \subset P'_\alpha$ and $P'_l \subset P_l$ for any label $l \neq \alpha$. In other words, an $\alpha$-expansion move allows any set of image pixels to change their labels to $\alpha$.

A move which assigns a given label $\alpha$ to a single pixel is both an $\alpha$-$\beta$ swap and an $\alpha$-expansion. As a consequence, a standard move is a special case of both an $\alpha$-$\beta$ swap and an $\alpha$-expansion.

Algorithms and Properties

Referring again to FIG. 1, there are two minimization algorithms in the present invention. The swap algorithm of FIG. 1a finds a local minimum when swap moves are allowed, and the expansion algorithm of FIG. 1b finds a local minimum when the expansion moves are allowed. Finding such a local minimum is not a trivial task. Given a labeling f, there is an exponential number of swap and expansion moves. Therefore, even checking for a local minimum requires exponential time if it is performed naively. In contrast checking for a local minimum when only the standard moves are allowed is easy since there is only a linear number of standard moves given any labeling f.

The algorithms are efficient graph based methods to find the optimal $\alpha$-$\beta$ or $\alpha$-expansion given a labeling f. This is the key step in the algorithms. Once these methods are available, it is easy to design some variations of the "fastest descent" technique that can efficiently find the corresponding local minimums.

The structure of the algorithms is similar. A single execution of steps 3.1–3.2 is called an iteration, and an execution of steps 2–4 is a cycle. In each cycle, the algorithm performs an iteration for every label (expansion algorithm) or for every pair of labels (swap algorithm), in a certain order that can be fixed or random. A cycle is successful if a strictly better labeling is found at any iteration. The algorithms stop after the first unsuccessful cycle since no further improvement is possible. Obviously, a cycle in the swap algorithm takes $|L|^2$ iterations, and a cycle in the expansion algorithm takes $|L|$ iterations. These algorithms are guaranteed to terminate in a finite number of cycles. Termination can be proved to be in $O(|P|)$ cycles. In experiments, the algorithm stops after a few cycles, and most of the improvements occur during the first cycle.

Graph cuts are used to efficiently find $\hat{f}$ for the key part of each algorithm in step 3.1. Step 3.1 uses a single minimum cut on a graph whose size is $O(|P|)$. The graph is dynamically updated after each iteration.

Graph Cuts

Before describing the key step 3.1 of the swap and the expansion algorithms, graph cuts will be reviewed. Let $G=(V,\epsilon)$ be a weighted graph with two distinguished vertices called the terminals. A cut $C \subset \epsilon$ is a set of edges such that the terminals are separated in the induced graph $G(C)=(V, \epsilon-C)$. In addition, no proper subset of $C$ separates the terminals in $G(C)$. The cost of the cut $C$, denoted $|C|$, equals the sum of its edge weights.

The minimum cut problem is to find the cut with smallest cost. This problem can be solved efficiently by computing the maximum flow between the terminals, according to a theorem due to Ford and Fulkerson. There are a large number of fast algorithms available in the art for this problem. The worst case complexity is low-order polynomial; however, for graphs of the present invention, the running time is nearly linear in practice.

Finding the Optimal Swap Move

Given an input labeling $f$ (partition $P$) and a pair of labels $\alpha$, $\beta$, a labeling $\hat{f}$ needs to be found that minimizes E over all labelings within one $\alpha$-$\beta$ swap of $f$. This is the, critical step in the swap move algorithm of FIG. 1a. The other technique of the present invention is based on computing a labeling corresponding to a minimum cut on a graph $G_{\alpha\beta}=(V_{\alpha\beta},\epsilon_{\alpha\beta})$. The structure of this graph is dynamically determined by the current partition $P$ and by the labels $\alpha,\beta$.

This section is organized as follows. The construction of $G_{\alpha\beta}$ for a given $f$ (or $P$) is described. Cuts $C$ on $G_{\alpha\beta}$ correspond in a natural way to labelings $f^C$ which are within one $\alpha$-$\beta$ swap move of $f$. Theorem 4.4 shows that the cost of a cut is $|C|=E(f^C)$ plus a constant. A corollary from this theorem states the main result that the desired labeling $\hat{f}$ equals $f^C$ where $C$ is a minimum cut on $G_{\alpha\beta}$.

FIG. 2 shows the structure of the graph. For legibility, this figure shows the case of a 1-D image. For any image, the structure of $G_{\alpha\beta}$ 100 will be as follows. The set of vertices includes the two terminals $\alpha$ 102 and $\beta$ 104, as well as image pixels P 106 in the sets $P_\alpha$ and $P_\beta$ (that is $f_p \in \{\alpha,\beta\}$). "$\alpha$" and "$\beta$" are also referred to as labels. Thus, the set of vertices $V_{\alpha\beta}$ consists of $\alpha$, $\beta$, and $P_{\alpha\beta}=P_\alpha \cup P_\beta$. Each pixel $p \in P_{\alpha\beta}$ is connected to the terminals $\alpha$ and $\beta$ by edges $t_p^\alpha$ 108 and $t_p^\beta$ 110, respectively. For brevity, these edges are referred to as t-links (terminal links). Each pair of pixels $\{p,q\} \subset P_{\alpha\beta}$ which are neighbors (i.e. $\{p,q\} \in N$ is connected by an edge $e_{\{p,q\}}$ 112 which are called an n-link (neighbor link). The set of edges $\epsilon_{\alpha\beta}$ thus consists of $U_{p \in P_{\alpha\beta}}\{t_p^\alpha, t_p^\beta\}$ (the t-links) and $$U_{\{p,q\} \in N \atop p,q \in P_{\alpha\beta}} e_{\{p,q\}}$$

(the n-links). The weights assigned to the edges according to Table 1.

TABLE 1

| edge | weight | for |
|---|---|---|
| $t_p^\alpha$ | $D_p(\alpha) + \sum_{q \notin N_p}^{q \in N_p} V(\alpha, f_q)$ | $p \in P_{\alpha\beta}$ |
| $t_p^\beta$ | $D_p(\beta) + \sum_{q \notin P_{\alpha\beta}}^{q \in N_p} V(\beta, f_q)$ | $p \in P_{\alpha\beta}$ |
| $e_{\{p,q\}}$ | $V(\alpha, \beta)$ | $\{p, q\} \in N$  $p, q \in P_{\alpha\beta}$ |

Any cut $C$ on $G_{\alpha\beta}$ must sever (include) exactly one t-link for any pixel $p \in P_{\alpha\beta}$. If neither t-link were in $C$, there would be a path between the terminals; while if both t-links were cut, then a proper subset of $C$ would be a cut. Thus, any cut leaves each pixel in $P_{\alpha\beta}$ with exactly one t-link. This defines a natural labeling $f^C$ corresponding to a cut $C$ on $G_{\alpha\beta}$, $$f_p^C \begin{cases} \alpha & \text{if } t_p^\alpha \in C \text{ for } p \in P_{\alpha\beta} \\ \beta & \text{if } t_p^\beta \in C \text{ for } p \in P_{\alpha\beta} \\ f_p & \text{for } p \in P, p \notin P_{\alpha\beta} \end{cases} \quad (8)$$

In other words, if the pixel p is in $P_{\alpha\beta}$ hen p is assigned label $\alpha$ when the cut $C$ separates p from the terminal $\alpha$; similarly, p is assigned label $\beta$ when $C$ separates p from the terminal $\beta$. If p is not in $P_{\alpha\beta}$ then its initial label $f_p$ is retained. This implies Lemma 4.1 A labeling $f^C$ corresponding to a cut $C$ on $G_{\alpha\beta}$ is one $\beta$-$\beta$ swap away from the initial labeling $f$.

Figure 3:
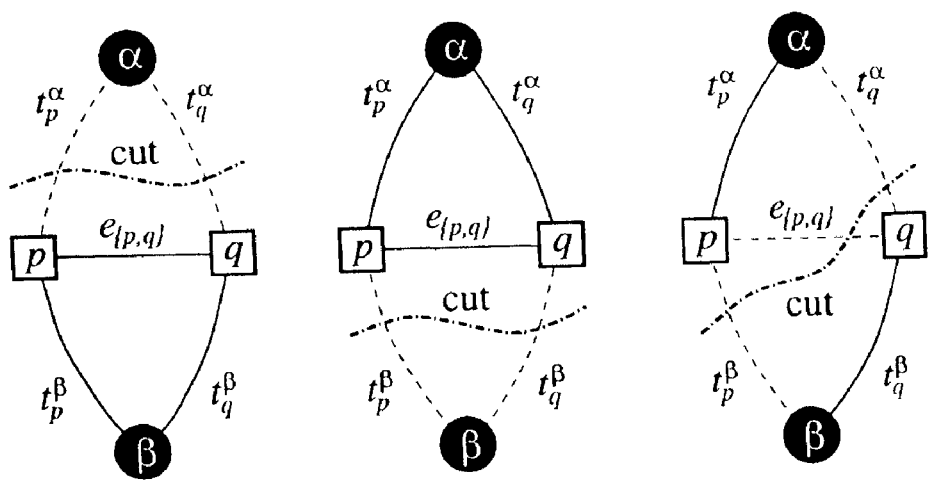
FIG. 3 are graph cut properties for the α-β swap method according to principles of the invention.

It is easy to show that a cut $C$ severs an n-link $e_{\{p,q\}}$ between neighboring pixels on $G_{\alpha\beta}$ if and only if $C$ leaves the pixels p and q connected to different terminals. FIG. 3 shows Property 4.2, which for any cut $C$ and for any n-link $e_{\{p,q\}}$ are:

a) If $t_p^\alpha, t_p^\alpha \in C$ then $e_{\{p,q\}} \notin C$.

b) If $t_p^\beta, t_q^\beta \in C$ then $e_{\{p,q\}} \notin C$.

c) If $t_p^\beta, t_q^\alpha \in C$ then $e_{\{p,q\}} \in C$.

d) If $t_p^\alpha, t_q^\beta \in C$ then $e_{\{p,q\}} \in C$. \quad (9)

Properties (a) and (b) follow from the requirement that no proper subset of $C$ should separate the terminals. Properties (c) and (d) also use the fact that a cut has to separate the terminals.

The next lemma is a consequence of property 4.2 and equation 8.

Lemma 4.3 For any cut $C$ and for any n-link $e_{\{p,q\}}$ $$|C \cap e_{\{p,q\}}|=V(f_p^C f_q^C)$$

PROOF: There are four cases with similar structure; the case where $t_\beta^\alpha, t_q^\beta \in C$ will be illustrated. In this case, $e_{\{p,q\}} \in C$ and, therefore, $|C \cap \epsilon_{\{p,q\}}|=V(\alpha,\beta)$. By (8), $f_p^C=\alpha$ and $f_q^C=\beta$.

Note that this proof assumes that V is a semi-metric, i.e. that equations 5 and 6 hold.

Lemmas 4.1 and 4.3 plus property 4.2 yield

Theorem 4.4 There is a one to one correspondence between cuts $C$ on $G_{\alpha\beta}$ and labelings hat are one $\alpha$-$\beta$ swap from $f$. Moreover, the cost of a cut $C$ on $G_{\alpha\beta}$ is $|C|=E(f^C)$ plus a constant.

Proof: The first part follows from the fact that the severed t-links uniquely determine the labels assigned to pixels p and the n-links that must be cut. The cost of a cut C is $$|C| = \sum_{p \in P_{\alpha\beta}} |C \cap \{t_p^\alpha, t_p^\beta\}| + \sum_{\substack{\{p,q\} \in N \\ \{p,q\} \subset P_{\alpha\beta}}} |C \cap e_{\{p,q\}}| \quad (10)$$

Note that for $p \in P_{\alpha\beta}$, $$|C \cap \{t_p^\alpha, t_p^\beta\}| = \begin{cases} |t_p^\alpha| \text{ if } t_p^\alpha \in C \\ |t_p^\beta| \text{ if } t_p^\beta \in C \end{cases} = D_p(f_p^C) + \sum_{\substack{q \in N_p \\ q \notin P_{\alpha\beta}}} V(f_p^C, f_q) \quad (11)$$

Lemma 4.3 gives the second term in (10). Thus, the total cost of a cut C is $$|C| = \sum_{p \in P_{\alpha\beta}} D_p(f_p^C) + \sum_{p \in P_{\alpha\beta}} \sum_{\substack{q \in N_p \\ q \notin P_{\alpha\beta}}} V(f_p^C, f_q) + \sum_{\substack{\{p,q\} \in N \\ \{p,q\} \subset P_{\alpha\beta}}} V(f_p^C, f_q) \quad (12)$$

$$= \sum_{p \in P_{\alpha\beta}} D_p(f_p^C) + \sum_{\substack{\{p,q\} \in N \\ p \text{ or } q \in P_{\alpha\beta}}} V(f_p^C, f_q^C)$$

This can be rewritten as $|C|=E(f^C)-K$ where $$K = \sum_{p \notin P_{\alpha\beta}} D_p(f_p) + \sum_{\substack{\{p,q\} \in N \\ \{p,q\} \cap P_{\alpha\beta} = \emptyset}} V(f_p, f_q) \quad (13)$$

is the same constant for all cuts C.

Corollary 4.5 The lowest energy labeling within a single α-β swap move from f is $\hat{f}=f^C$, where C is the minimum cut on $G_{\alpha\beta}$.

Figure 4:
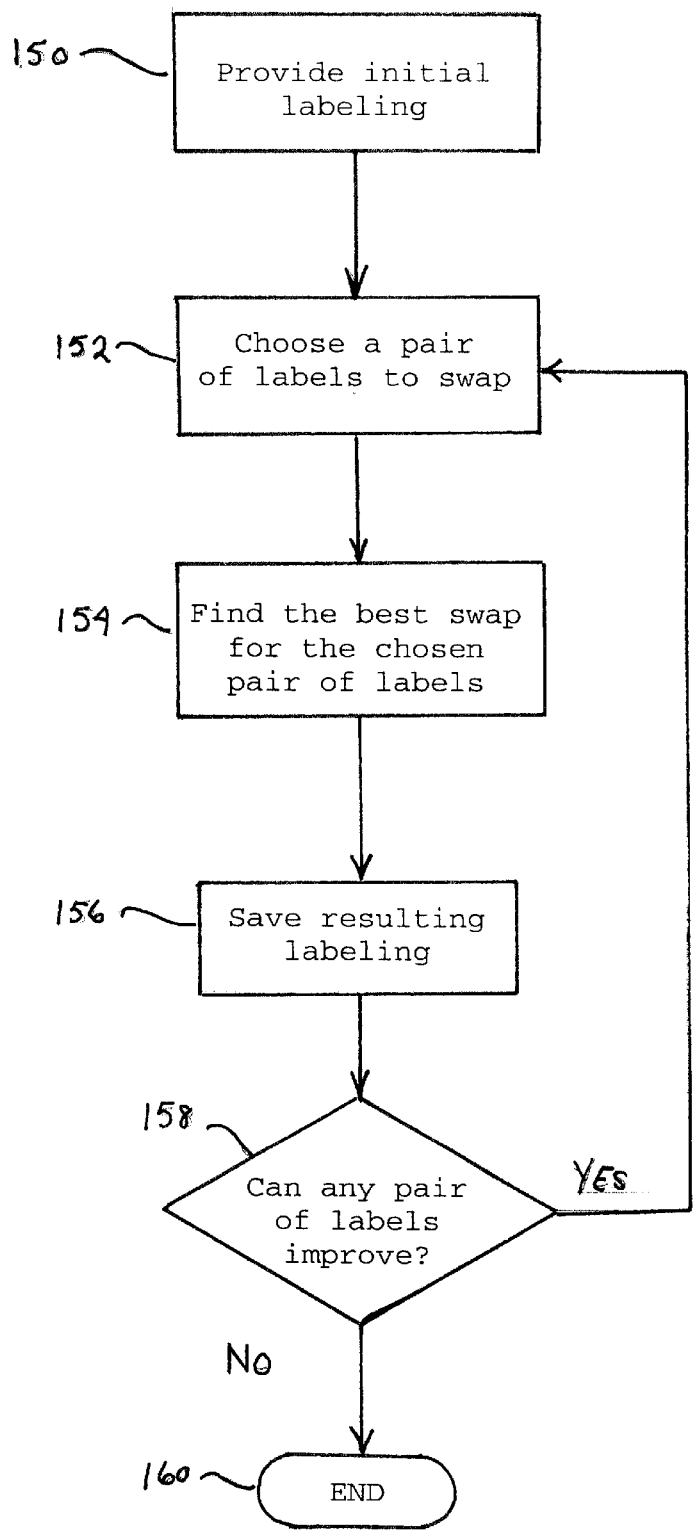

FIG. 4 shows the operation of the application of the α-β swap method. A single view typically has a plurality of labels. The input to the method, as described above, is the neighborhood system with some arbitrary or other initial solution having an initial labeling, block 150.

Next, a pair of labels to swap is chosen, block 152. Then, using the graph cuts described above, the best swap for the chosen pair of labels is determined, block 154. The minimum cut is chosen by assigning weights to the various links in the graph according to Table 1. A minimum cut is calculated from the weighted links.

The new labeling that results from finding the best swap move is stored, block 156.

In the preferred embodiment of the invention, the method determines if any pair of label combinations can be improved, block 158. If yes, the algorithm moves on to another pair of labels and the process repeats until no label combinations can be improved. If there are no more improvements that can be made, the process ends, block 160. In alternative embodiments of the invention, the iteration continues only until some acceptable solution is obtained.

Finding the Optimal Expansion Move

Given an input labeling f (partition P) and a label α, a labeling $\hat{f}$ that minimizes E over all labelings within one α-expansion of f needs to be found. This is the critical step in the expansion move algorithm of FIG. 1b. A technique that solves the problem assumes that each V is a metric, and thus satisfies the triangle inequality (7). The technique is based on computing a labeling corresponding to a minimum cut on a graph $G_\alpha=(V_\alpha, \epsilon_\alpha)$. The structure of this graph is determined by the current partition P and by the label α. As before, the graph dynamically changes after each iteration.

This section is organized as follows. The construction of $G_\alpha$ for a given f (or P) and a is described. Then cuts C on $G_\alpha$ are shown to correspond in a natural way to labelings $f^C$ which are within one α-expansion move of f. Then, based on a number of simple properties, a class of elementary cuts is defined. Theorem 5.4 shows that elementary cuts are in one to one correspondence with labelings that are within one α-expansion of f, and also that the cost of an elementary cut is $|C|=E(f^C)$. A corollary from this theorem states the main result that the desired labeling $\hat{f}$ is $f^C$ where C is a minimum cut on $G_\alpha$.

Figure 5:
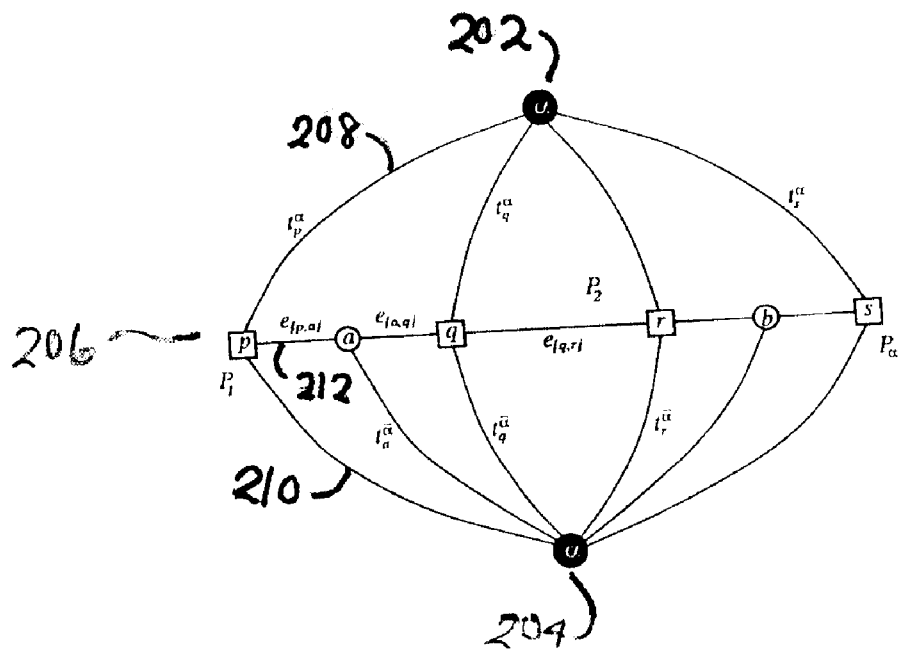
FIG. 5 is a graph system for the α-expansion method of the present invention.

The structure of the graph is illustrated in FIG. 5. For legibility, this figure shows the case of a 1-D image. The set of vertices includes the two terminals α 202 and $\bar{\alpha}$ 204, as well as all image pixels p∈P 206. In addition, for each pair of neighboring pixels {p,q}∈N separated in the current partition (i.e. such that $f_p \neq f_q$, an auxiliary vertex $a_{\{p,q\}}$ is created. Auxiliary nodes are introduced at the boundaries between partition sets $P_l$ for l∈L. Thus, the set of vertices is $$V_\alpha = \left\{ \alpha, \bar{\alpha}, P, \bigcup_{\substack{\{p,q\} \in N \\ f_p \neq f_q}} a_{\{p,q\}} \right\} \quad (14)$$

Each pixel p∈P is connected to the terminals α and $\bar{\alpha}$ by t-links $t_p^\alpha$ 208 and $t_p^{\bar{\alpha}}$ 210, respectively. Each pair of neighboring pixels {p,q}∈N which are not separated by the partition P (i.e. such that $f_p=f_q$) is connected by an n-link; $e_{\{p,q\}}$ 212. For each pair of neighboring pixels {p,q}∈N such that $f_p \neq f_q$ a triplet of edges $\epsilon_{\{p,q\}} = \{e_{\{p,a\}}, e_{\{a,q\}}, t_a^{\bar{\alpha}}\}$ is created where $a=a_{\{p,q\}}$ is the corresponding auxiliary node. The edges $e_{\{p,a\}}$ and $e_{\{a,q\}}$ connect pixels p and q to $a_{\{p,q\}}$ and the t-link $t_a^{\bar{\alpha}}$ connects the auxiliary node $a_{\{p,q\}}$ to the terminal $\bar{\alpha}$. The set of all edges may be written as $$\varepsilon_\alpha = \left\{ \bigcup_{p \in P} \{t_p^\alpha, t_p^{\bar{\alpha}}\}, \bigcup_{\substack{\{p,q\} \in N \\ f_p \neq f_q}} \varepsilon_{\{p,q\}}, \bigcup_{\substack{\{p,q\} \in N \\ f_p = f_q}} e_{\{p,q\}} \right\} \quad (15)$$

The weights are assigned to the edges according to, Table 2.

TABLE 2

| edge | weight | for |
| --- | --- | --- |
| $t_p^{\bar{\alpha}}$ | ∞ | $p \in P_\alpha$ |
| $t_p^{\bar{\alpha}}$ | $D_p(f_p)$ | $p \notin P_\alpha$ |
| $t_p^\alpha$ | $D_p(\alpha)$ | $p \in P$ |
| $e_{\{p,a\}}$ | $V(f_p, \alpha)$ | $\{p,q\} \in N, f_p \neq f_q$ |
| $e_{\{a,q\}}$ | $V(\alpha, f_q)$ | $\{p,q\} \in N, f_p \neq f_q$ |
| $t_a^{\bar{\alpha}}$ | $V(f_p, f_q)$ | $\{p,q\} \in N, f_p \neq f_q$ |
| $e_{\{p,q\}}$ | $V(f_p, \alpha)$ | $\{p,q\} \in N, f_p = f_q$ |

Any cut C on $G_\alpha$ must sever (include) exactly one t-link for any pixel p∈P. This defines a natural labeling $f^C$ corresponding to a cut C on $G_\alpha$. Formally, $$f_p^C = \begin{cases} \alpha & \text{if } t_p^\alpha \in C \\ & \forall_p \in P \\ f_p & \text{if } t_p^{\bar\alpha} \in C \end{cases} \quad (16)$$

In other words, a pixel p is assigned label $\alpha$ if the cut C separates p from the terminal $\alpha$, while p is assigned its old label $f_p$ if C separates p from $\bar\alpha$. Note that for $p \notin P_\alpha$ the terminal $\bar\alpha$ represents labels assigned to pixels in the initial labeling f. Clearly this leads to:

Lemma 5.1 A labeling $f^C$ corresponding to a cut C on $G_\alpha$ is one $\alpha$-expansion away from the initial labeling f.

It is also easy to show that a cut C severs an n-link $e_{\{p,q\}}$ between neighboring pixels $\{p,q\} \in N$ such that $f_p = f_q$ if and only if C leaves the pixels p and q connected to different terminals. In other words, property 4.2 holds when "$\bar\alpha$" is substituted for "$\beta$". This as property is referred to as 4.2($\bar\alpha$). Analogously, that property 4.2 and equation 16 establish lemma 4.3 for the n-links $e_{\{p,q\}}$ in $G_\alpha$.

Consider now the set of edges $\epsilon_{\{p,q\}}$ corresponding to a pair of neighboring pixels $\{p,q\} \in N$ such that $f_p \neq f_q$. In this case, there are several different ways to cut these edges even when the pair of severed t-links at p and q is fixed. However, a minimum cut C on $G_\alpha$ is guaranteed to sever the edges in $\epsilon_{\{p,q\}}$ depending on what t-links are cut at the pixels p and q.

Figure 6:
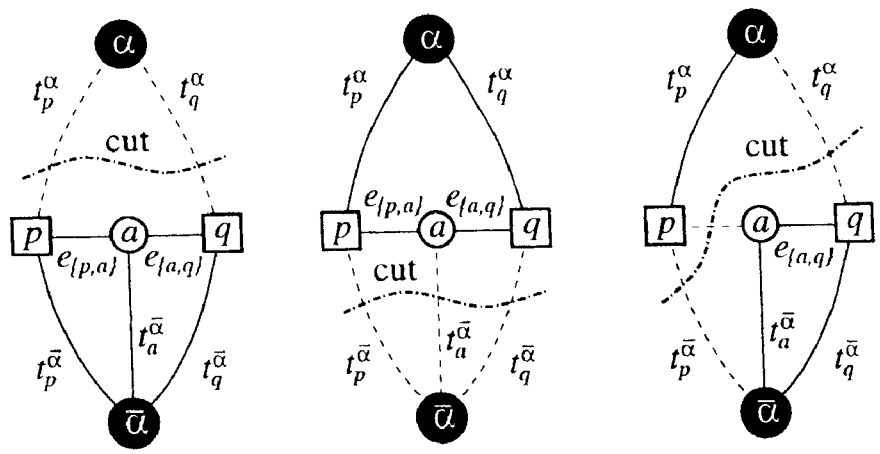
FIG. 6 are graph cut properties for the α-expansion method of FIG. 1b.

FIG. 6 shows the rule for this case as described in property 5.2 below. Assume that $\alpha = \alpha_{\{p,q\}}$ is an auxiliary node between the corresponding pair of neighboring pixels.

Property 5.2 If $\{p,q\} \in N$ and $f_p \neq f_q$ then a minimum cut C on $G_\alpha$ satisfies:

a) If $t_p^\alpha, t_q^\alpha \in C$ then $C \cap \epsilon_{\{p,q\}} = 0$.

b) If $t_p^{\bar\alpha}, t_q^{\bar\alpha} \in C$ then $C \cap \epsilon_{\{p,q\}} = t_a^{\bar\alpha}$.

c) If $t_p^{\bar\alpha}, t_q^\alpha \in C$ then $C \cap \epsilon_{\{p,q\}} = e_{\{p,a\}}$ d) If $t_p^\alpha, t_q^{\bar\alpha} \in C$ then $C \cap \epsilon_{\{p,q\}} = e_{\{a,q\}}$ Property 5.2(a) results from the fact that no subset of C is a cut. The others follow from the minimality of $|C|$ and the fact that $|e_{\{p,a\}}|$, $|e_{\{a,q\}}|$ and $|t_a^{\bar\alpha}|$ satisfy the triangle inequality so that cutting any one of them is cheaper than cutting the other two together.

Lemma 5.3 If If $\{p,q\} \in N$ and $f_p \neq f_q$ then the minimum cut C on $G_\alpha$ satisfies:

$$|C \cap \epsilon_{\{p,q\}}| = V(f_p^C, f_q^C)$$

Proof: The equation follows from property 5.2, equation (16), and the edge weights. For example,
If $t_p^{\bar\alpha}, t_q^{\bar\alpha} \in C$ then $C \cap \epsilon_{\{p,q\}} = |t_a^{\bar\alpha}| = V(f_p, f_q)$ At the same time, (16) implies that $f_p^C = f_p$ and $f_q^C = f_q$. Note that the right penalty V is imposed whenever $f_p^C \neq f_q^C$, due to the auxiliary pixel construction.

Property 4.2 ($\bar\alpha$) holds for any cut, and property 5.2 holds for a minimum cut. However, there can be other cuts; besides the minimum cut that satisfy both properties. An elementary cut on $G_\alpha$ is defined as a cut that satisfies properties 4.2 ($\bar\alpha$) and 5.2.

Theorem 5.4 Let $G_\alpha$ be constructed as above given f and $\alpha$. Then there is a one to one correspondence between elementary cuts on $G_\alpha$ and labelings within one $\alpha$-expansion of f. Moreover, for any elementary cut C, $|C| = E(f^C)$ is the result. Proof: An elementary cut C is uniquely determined by the corresponding labeling $f^C$. The label $f_p^C$ at the pixel p determines which of the t-links to p is in C. Property 4.2 ($\bar\alpha$) shows which n-links $e_{\{p,q\}}$ between pairs of neighboring pixels $\{p,q\}$ such that $f_p = f_q$ should be severed. Similarly, property 5.2 determines which of the links in $\epsilon_{\{p,q\}}$ corresponding o $\{p,q\} \in N$ such that $f_p \neq f_q$ should be cut.

The cost of an elementary cut C is $$|C| = \sum_{p \in P} |C \cap \{t_p^\alpha, t_p^{\bar\alpha}\}| + \sum_{\substack{(p,q) \in N \\ f_p = f_q}} |C \cap e_{\{p,q\}}| + \sum_{\substack{(p,q) \in N \\ f_p \neq f_q}} |C \cap \epsilon_{\{p,q\}}| \quad (17)$$

It is easy to show that for any pixel p∈P, the result is $$|C \cap \{t_p^\alpha, t_p^{\bar\alpha}\}| = D_p(f_p^C). \quad (18)$$

Lemmas 4.3 and 5.3 hold for elementary cuts, since they were based on properties 4.2 and 5.2. Thus, the total cost of a elementary cut C is $$|C| = \sum_{p \in P} D_p(f_p^C) + \sum_{(p,q) \in N} V(f_p^C, f_q^C) = E(f^C) \quad (19)$$

Therefore, $|C| = E(f^C)$.

Our main result is a simple consequence of this theorem, since the minimum cut is an elementary cut.

Corollary 5.5 The lowest energy labeling within a single $\alpha$-expansion move from f is $\hat{f} = f^C$, where C is the minimum cut on $G_\alpha$.

Figure 7:
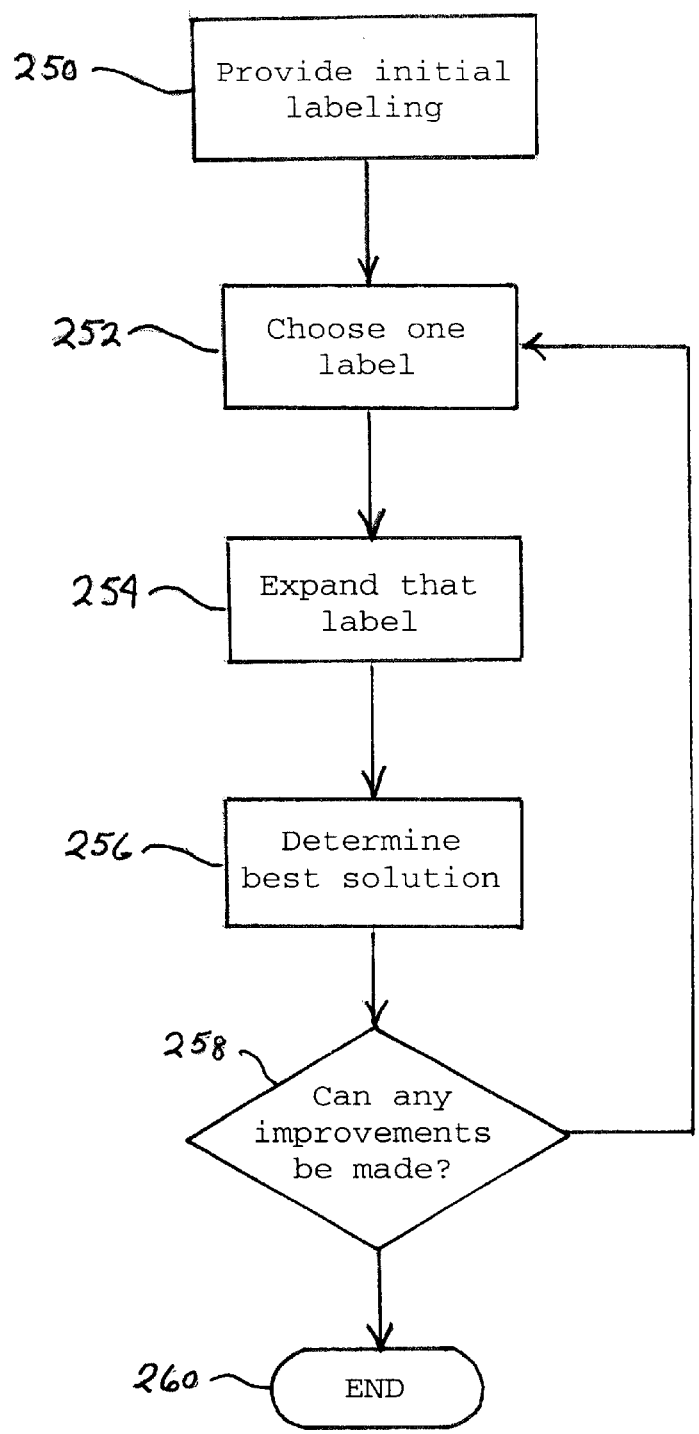
FIG. 7 is a flow chart of the operation of the α-expansion method of FIG. 1b.

FIG. 7 shows the operation of the $\alpha$-expansion method of the present invention. A single view in computer vision typically has a plurality of labels. The input to the method is the neighborhood system with some arbitrary or other initial solution including a set of initial labeling, block 250.

Next, a label is chosen, block 252. The chosen label is expanded, block 254. That is, any pixel is allowed to take on the chosen label. Then the best solution is determined using the minimum graph cut method, block 256. Each link in the graph is assigned a weight according to Table 2 and cuts are made to determine the best solution as described above. In a preferred embodiment of the invention, the method then determines if any more improvements may be made, block 258. If yes, the method repeats until no further improvements may be made and then the process ends, block 260. In an alternative embodiment of the invention, the iteration continues only until an acceptable solution is obtained.

Optimality Properties

Any local minimum generated by the expansion moves algorithm of the present invention is within a known factor from the global optimum. This algorithm works in case of metric V. The swap move algorithm can be applied to a wider class of semi-metric V's but, unfortunately, it does not have any guaranteed optimality properties. A provably good solution can be obtained even for semi-metric V by approximating such V's with a simple Potts metric.

The Expansion Move Algorithm

A local minimum when expansion moves are allowed is within a known factor of the global minimum. This factor, which can be as small as 2, will depend on V. Specifically, let $$c = \frac{\max_{\alpha \neq \beta \in L} V(\alpha, \beta)}{\min_{\alpha \neq \beta \in L} V(\alpha, \beta)} \quad (20)$$

be the ratio of the largest non zero value of V to the smallest non zero value of V. Note that c is well defined since $V(\alpha,\beta) \neq 0$ for $\alpha \neq \beta$ according to the metric properties (2) and (3). If $V_{p,q}$'s are different for neighboring pairs p,q $$\text{then } c = \max_{p,q \in N} \left( \frac{\max_{\alpha \neq \beta \in L} V(\alpha, \beta)}{\min_{\alpha \neq \beta \in L} V(\alpha, \beta)} \right).$$

Theorem 6.1 Let $\hat{f}$ be a local minimum when the expansion moves are allowed and f* be the globally optimal solution. Then $E(\hat{f}) \leq 2cE(f^*)$
Proof: Fix some $\alpha \in L$ and let $$P_\alpha = \{p \in P | f^*_p = \alpha\} \quad (21)$$

A labeling $f^\alpha$ can be produced within one $\alpha$-expansion move from $\hat{f}$ as follows:

$$f_p^\alpha = \begin{cases} \alpha & \text{if } p \in P_\alpha \\ \hat{f}_p & \text{otherwise} \end{cases} \quad (22)$$

The key observation is that since $\hat{f}$ is a local minimum if expansion moves are allowed, $$E(\hat{f}) \leq E(f^\alpha). \quad (23)$$

Let S be a set consisting of any number of pixels in P and any number of pairs of neighboring pixels in N. E(f|S) is defined to be a restriction of the energy of labeling f to the set S:

$$E(f|S) = \sum_{p \in S} D_p(f_p) + \sum_{\{p,q\} \in S} V(f_p, f_q) \quad (24)$$

Let $I^\alpha$ be the set of pixels and pairs of neighboring pixels contained inside $P_\alpha$. Also, let $B^\alpha$ be the set of pairs of neighboring pixels on the boundary of $P_\alpha$ and $O^\alpha$ be the set of pixels and pairs of neighboring pixels contained outside of $P_\alpha$. Formally, $$I^\alpha = P_\alpha \bigcup \{\{p, q\} \in N : p \in P_\alpha, q \in P_\alpha\} \quad (25)$$

$$B^\alpha = \{\{p, q\} \in N : p \in P_\alpha, q \notin P_\alpha\} \quad (26)$$

$$O^\alpha = (P - P_\alpha) \bigcup \{\{p, q\} \in N : p \notin P_\alpha, q \notin P_\alpha\} \quad (27)$$

The following three facts hold:

$$E(f^\alpha|O^\alpha) = E(\hat{f}|O^\alpha), \quad (28)$$

$$E(f^\alpha|I^\alpha) = E(f^*|I^\alpha), \quad (29)$$

$$E(f^\alpha|B^\alpha) \leq cE(f^*|B^\alpha). \quad (30)$$

Equations 28 and 29 are obvious from the definitions in (22) and (21). Equation (30) holds because for any $\{p,q\} \in B^\alpha$ there is $V(f_p^\alpha, f_q^\alpha) \leq cV(f^*_p, f^*_q) \neq 0$.
Since $I^\alpha \cup B^\alpha \cup O^\alpha$ includes all pixels in P and all neighboring pairs of pixels in N, both sides of (23) can be expanded to get:

$$E(\hat{f}|I^\alpha) + E(\hat{f}|B^\alpha) + E(\hat{f}|O^\alpha) \leq E(f^\alpha|I^\alpha) + E(f^\alpha|B^\alpha) + E(f^\alpha|O^\alpha) \quad (31)$$

Using (28), (29) and (30) the following equation is derived from the equation above:

$$E(\hat{f}|I^\alpha) + E(\hat{f}|B^\alpha) \leq E(f^*|I^\alpha) + cE(f^*|B^\alpha) \quad (32)$$

To get the bound on the total energy, equation (32) is summed over all labels $\alpha \in L$:

$$\sum_{\alpha \in L} (E(\hat{f}|I^\alpha) + E(\hat{f}|B^\alpha)) \leq \sum_{\alpha \in L} (E(f^*|I^\alpha) + cE(f^*|B^\alpha)) \quad (33)$$

Let $$B = \bigcup_{\alpha \in L} B^\alpha.$$

Observe that for every $\{p,q\} \in B$, the term $V(\hat{f}_p, \hat{f}_q) = E(\hat{f}|\{p,q\})$ appears twice on the left side of (33), once in $E(\hat{f}|B^\alpha)$ for $\alpha = f^*_p$ and once in $E(\hat{f}|B^\alpha)$ for $\alpha = f^*_q$. Similarly every $V(f^*_p, f^*_q) = E(f^*|\{p,q\})$ appears 2c times on the right side of (33). Therefore equation (33) can be rewritten to get the bound of 2c:

$$E(\hat{f}) + E(\hat{f}|B) \leq E(f^*) + (2c-1)E_B(f^*) \leq 2cE(f^*) \quad (34)$$

Figure 8:
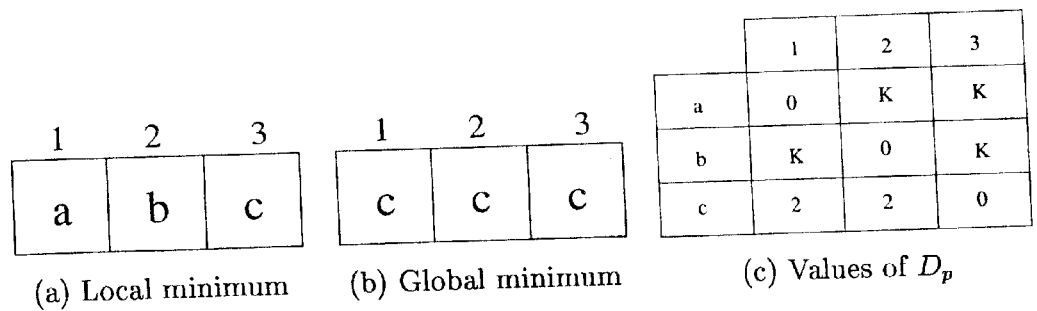
FIGS. 8a, 8b and 8c are tables illustrating a local minimum where swap moves are arbitrarily far from the global minimum.

It can be shown that any algorithm that is within a factor of 2 for the Potts model is within a factor of 2c for an arbitrary metric V.
Approximating a Semi-metric
FIGS. 8a, 8b and 8c are tables illustrating a local minimum where swap moves are arbitrarily far from the global minimum.

The expansion algorithm of the present invention can be used to get an answer within a factor of 2c from the optimum of energy (4) even when V is a semi-metric. Actually just $V(\alpha, \beta) \geq 0$ and $V(\alpha, \beta) = 0 \Leftrightarrow \alpha = \beta$ are needed. Here c is the same as in Theorem 6.1. This c is still well defined for a semi-metric. Suppose that penalty V inside the definition of energy E in (4) is a semi-metric. Let r be any real number in the interval [m,M] where $$m = \min_{\alpha \neq \beta \in L} V(\alpha, \beta) \quad \text{and} \quad M = \max_{\alpha \neq \beta \in L} V(\alpha, \beta)$$

Define a new energy based on the Potts interaction model $$E_P(f) = \sum_{p \in P} D_p(f_p) + \sum_{\{p,q\} \in N} r \cdot T(f_p \neq f_q) \quad (35)$$

Theorem 6.2 If $\hat{f}$ is a local minimum of $E_P$ given the expansion moves and f* is the global minimum of E(f) then $E(\hat{f}) \leq 2cE(f^*)$.
Proof: Suppose f° is the global minimum of $E_P$. Then $$\frac{r}{M} E(\hat{f}) \leq E_P(\hat{f}) \leq 2E_P(f^\circ) \leq 2E_P(f^*) \leq 2\frac{r}{m} E(f^*)$$

where the second inequality follows from Theorem 6.1. Note that c=M/m.

Thus to find an answer within a fixed factor from the global minimum for a semi-metric V, one can take a local minimum $\hat{f}$ given the expansion moves for $E_P$ as defined above. Note that that such an $\hat{f}$ is not a local minimum of E(f) given the expansion moves. In practice, it has been found find that local minimum given the swap moves gives empirically better results than using $\hat{f}$. In fact, the estimate $\hat{f}$ can be used as a good starting point for the swap algorithm. In this case, the swap move algorithm will also generate a local minimum whose energy is within a known factor from the global minimum.

The Potts Model

An interesting special case of the energy in equation (4) arises when V is given by the Potts model $$E_P(f) = \sum_{\{p,q\} \in N} u_{\{p,q\}} \cdot T(f_p \neq f_q) + \sum_{p \in P} D_p(f_p) \qquad (36)$$

In this case, discontinuities between any pair of labels are penalized equally. This is in some sense the simplest discontinuity preserving model and it is especially useful when the labels are unordered or the number of labels is small. The Potts interaction penalty $V_{p,q} = u_{\{p,q\}} \cdot T(f_p \neq f_q)$ is a metric; in this case c=1 and the expansion algorithm of the present invention gives a solution that is within a factor of 2 of the global minimum. Note that by definition $c \geq 1$, so this is the energy function with the best bound.

The Potts model energy minimization problem is closely related to a known combinatorial optimization problem called the multiway cut problem. The Potts model energy minimization problem can be reduced to the multiway cut problem. More precisely, it can be proved that the global minimum of the Potts model energy $E_P$ can be computed by finding the minimum cost multiway cut on an appropriately constructed graph. In order to efficiently compute the global minimum of $E_P$, a certain class of multiway cut problems that are known to be NP-hard could also be solved. Minimizing $E_P$ is NP-hard, and so is minimizing the energy in (4).

The multiway cut problem is defined on a graph G=(V,E), with non-negative edge weights, with a set of terminal vertices $L \subset V$. A subset of the edges $C \subset \epsilon$ is called a multiway cut if the terminals are completely separated in the {induced} graph $G(C)=(V, \epsilon - C)$. It is also required that no proper subset of C separates the terminals in G(C). The cost of the multiway cut C is denoted by |C| and equals the sum of its edge weights. The multiway cut problem is to find the minimum cost multiway cut. The multiway cut problem is NP-: complete. The multiway cut problem is a generalization of the standard two-terminal graph cut problem.

The Potts Model and the Multiway Cut Problem

The problem of minimizing the Potts energy $E_P(f)$ can be solved by computing a minimum cost multiway cut on a certain graph. Given $V=P \cup L$, means that G contains two types of vertices: p-vertices (pixels) and l-vertices (labels). Note that l-vertices will serve as terminals or the multiway cut problem. Two p-vertices are connected by an edge if and only if the corresponding pixels are neighbors in the neighborhood system N. The set $\epsilon_N$ consists of the edges between p-vertices, called n-links. Each n-link $\{p,q\} \in \epsilon_N$ is assigned a weight $w_{\{p,q\}} = u_{\{p,q\}}$.

Each p-vertex is connected by an edge to each l-vertex. An edge {p,l} that connects a p-vertex with a terminal (an l-vertex) will be called a t-link and the set of all such edges will be denoted by $\epsilon_T$. Each t-link {p,l} in $\epsilon_T$ is assigned a weight $w_{\{p,l\}} = K_p - D_p(l)$; where $K_p > \max_l D_p(l)$ is a constant that is large enough to make the weights positive. The edges of the graph are $\epsilon = \epsilon_N \cup \epsilon_T$.

Figure 9:
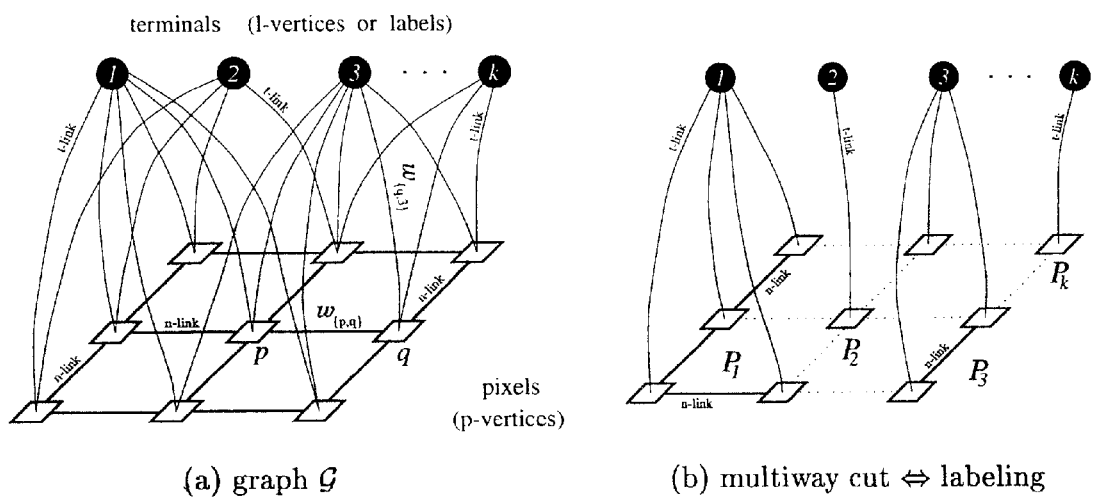
FIG. 9a is a graph system using the Potts model.
FIG. 9b is the graph system of FIG. 9a after a multi-way cut method has been applied.

FIG. 9a shows the structure of the graph G. The graph $G=(V,\epsilon)$ with terminals $L=\{1, \ldots, k\}$. The pixels $p \in P$ are shown as white squares. Each pixel has an n-link to its four neighbors. Each pixel is also connected to all terminals by t-links (some of the t-links are omitted from the drawing for clarity). The set of vertices $V=P \cup L$ includes all pixels and terminals. The set of edges $\epsilon = \epsilon_N \cup \epsilon_T$, consists of all n-links and t-links.

It is easy to see that there is a one-to-one correspondence between multiway cuts and labelings. A multiway cut C corresponds to the labeling $f^C$ which assigns the label l to all pixels p which are t-linked to the l-vertex in G(C). An example of a multiway cut and the corresponding image partition (labeling) is given in FIG. 9b. The multiway cut corresponds to a unique partition (labeling) of image pixels.

Theorem 7.1 If C is a multiway cut on $G_\alpha$ then $|C|=E_P(f^C)$ plus a constant.

Corollary 7.2 If C is a minimum cost multiway cut on G, then $f^C$ minimizes $E_P$.

While the multiway cut problem is known to be NP-complete if there are more than 2 terminals, there is a fast approximation algorithm. This algorithm works as follows. First, for each terminal $l \in L$, it finds an isolating two-way minimum cut C(l) that separates l from all other terminals. This is just the standard graph cut problem. Then the algorithm generates a multiway cut $C = U_{l \neq l_{max}} C(l)$ where $l_{max} = \arg\max_{l \in L} |C(l)|$ is the terminal with the largest cost isolating cut. This "isolation heuristic" algorithm produces a cut which is optimal to within a factor of $$2 - \frac{2}{|L|}.$$

However, the isolation heuristic algorithm suffers from two problems that limits its applicability to the energy minimization problem.

First, the algorithm will assign many pixels a label that is chosen essentially arbitrarily. Note that the union of all isolating cuts $U_{l \in L} C(l)$ may leave some vertices disconnected from any terminal. The multiway cut $C = U_{l \neq l_{max}} C(l)$ connects all those vertices to the terminal $l_{max}$.

Second, while the multiway cut C produced is close to optimal, this does not imply that the resulting labeling $f^C$ is close to optimal. Formally, write theorem 7.1 as $|C|=E_P(C)+K$ (the constant K results from the $K_p$'s. The isolation heuristic gives a solution $\hat{C}$ such that $|\hat{C}| \leq 2|C^*|$, where $C^*$ is the minimum cost multiway cut. Thus, $E_P(\hat{C})+K \leq 2(E_P(C^*)+K)$, so $E_P(\hat{C}) \leq 2E_P(C^*)+K$. As a result, the isolation heuristic algorithm does not produce a labeling whose energy is within a constant factor of optimal.

Minimizing the Potts Energy is NP-hard

For an arbitrary fixed graph G=(V,E), it is possible to construct an instance of minimizing $E_P(f)$ where the optimal labeling f* determines a minimum multiway cut on G. This will prove that a polynomial-time method for finding f* would provide a polynomial-time algorithm for finding the minimum cost multiway cut, which is known to be NP-hard.

The energy minimization problem takes as input a set of pixels P, a neighborhood relation N and a label set L, as well as a set of weights $u_{\{p,q\}}$ and a function $D_p(l)$. The problem is to find the labeling f* that minimizes the energy $E_P(f)$ given in equation (36).

Let $G=(V,\epsilon)$ be an arbitrary weighted graph with terminal vertices $\{t_1, \ldots, t_k\} \subset V$ and edge weights $w_{\{p,q\}}$. The energy minimization using P=V, N=E, and $u_{\{p,q\}}=w_{\{p,q\}}$. The label set will be $L=\{1, \ldots, k\}$. Let K be a constant such that $K > E_P(f^*)$; for example, K can be selected to be the sum of all $w_{\{p,q\}}$. The function $D_p(l)$ will force $f^*(t_j)=j$; if $p=t_j$ is a terminal vertex, $$D_P(l) = \begin{cases} 0 & l = j, \\ K & \text{otherwise.} \end{cases}$$

For a non-terminal vertex p all labels are equally good, $$\forall l \, D_p(l)=0.$$

A labeling f is defined to be feasible if the set of pixels labeled j by f forms a connected component that includes $t_j$. Feasible labelings obviously correspond one-to-one with multiway cuts.

Theorem 7.3 The labeling f* is feasible, and the cost of a feasible labeling is the cost of the corresponding multiway cut.

Proof: To prove that f* is feasible, suppose that there were a set S of pixels that f* labeled j which were not part of the component containing $t_j$. A labeling could then be obtained having lower energy by switching this set to the label of some pixel on the boundary of S. The energy of a feasible labeling f is $$\sum_{\{p,q\} \in N} u_{\{p,q\}} \cdot T(f(p) \neq f(q)),$$

which is the cost of the multiway cut corresponding to f.

This shows that minimizing the Potts model energy $E_P(f)$ on an arbitrary P and N is intractable. In computer vision, however, P is usually a planar grid, and combinatorial problems that are intractable on arbitrary graphs sometimes become tractable on the plane or grid.

The energy minimization problem is intractable even when restricted to a planar grid. The reduction is from a special case of the multiway cut problem, where G is a planar graph with degree 11 and all the edges have weight 1, which is NP-hard. G must be embedded in a grid of pixels, which happens in two stages. In the first stage, G is converted into a planar graph of degree 4. In the second stage, this graph is embedded in the grid. This embedding can be done in polynomial time; after it is done, each vertex v E G corresponds to a connected set of pixels S(v) in the grid, and the adjacency relationships among vertices in G has been preserved.

The proof now proceeds along the same lines as theorem 7.3, except for three subtleties. First, for every vertex v all pixels in S(v) are given the same label. This is ensured by making the edge weights K between adjacent pixels in S(v). Second, there are gaps when G is embedded in the grid. This can be solved by adding additional "grid pixels", which D forces to have the extra label 0 (D will prevent non-grid pixels from having label 0 by making $D_p(0)=K$). The edge weights are taken between grid pixels and non-grid pixels to be one. The cost of a feasible labeling is now the cost of the corresponding multiway cut plus a constant. Third, the constant $K>E_P(f^*)$ must be now chosen more carefully.

Experimental Results

The algorithms of the present invention were applied to image restoration and visual correspondence and achieved promising results.

The experimental results are from visual correspondence for stereo and motion. In visual correspondence, two images are taken at the same time from different view points for stereo, and are also taken from the same view point but at different times for motion. For each pixel in the first image there is a corresponding pixel in the second image which is a projection along the line of sight of the same real world scene element. The difference in the coordinates of the corresponding points is called the disparity. In stereo the disparity is usually one-dimensional because corresponding points lie along epipolar lines. In motion the disparity is usually a two-dimensional quantity. The disparity varies smoothly everywhere except at object boundaries, and corresponding points are expected to have similar intensities. The correspondence problem can be formulated as the energy minimization problem $$E(f) = \sum_{\{p,q\} \in N} V_{p,q}(f_p, f_q) + \sum_{p \in P} D(I_p - I'_{p+f_p})$$

Here P is the set of all pixels in the first image, $I_p$ is the intensity of pixel p in the first image, $I_q'$ is the intensity of pixel q in the second image, and $p+f_p$ stands for the pixel with coordinates of p shifted by disparity $f_p$. The data penalty D is small if there is a small difference between $I_p$ and $i'_{p+f_p}$.

For the experiments, three energy functions were used. The first energy function, called $E_Q$, uses the truncated quadratic $V(f_p,f_q)=\min(K,|f_p,f_q|^2)$ (for some constant K) as its smoothness term. This choice of V does not obey the triangle inequality, so $E_Q$ was minimized using the swap algorithm of the present invention.

The second ($E_P$) and the third ($E_L$) energy functions use, correspondingly, the Potts model and the truncated $L_2$ distance as their smoothness penalty V. Both of these obey the triangle inequality and $E_P$ and $E_L$ were minimized with the expansion algorithm of the present invention.

Data Term

If the pixels p and q correspond, they are assumed to have similar intensities $I_p$ and $I'_q$. Thus $(I_p-I'_q)^2$ is frequently used as a penalty for deciding that p and q correspond. This penalty has a heavy weight unless $I_p \approx I'_q$. However there are special circumstances when corresponding pixels have very different intensities due to the effects of image sampling. Suppose that the true disparity is not an integer. If a pixel overlaps a scene patch with high intensity gradient, then the corresponding pixels may have significantly different intensities.

For stereo, a technique is used to develop a $D_p$ that is insensitive to image sampling. First it was measured how well p fits into the real valued range of disparities $$\left(d-\frac{1}{2}, d+\frac{1}{2}\right)$$

by $$C_{fwd}(p, d) = \min_{d-\frac{1}{2} \leq x \leq d+\frac{1}{2}} |I_\alpha - I'_{p+d}|$$

Fractional values $I'_{p+x}$ are the result by linear interpolation between discrete pixel values. For symmetry, $$C_{rev}(p, d) = \min_{p-\frac{1}{2} \leq x \leq p+\frac{1}{2}} |I_x - I'_{p+d}|$$

is also measured. $C_{fwd}(p,d)$ and $C_{rev}(p,d)$ can be computed with just a few comparisons. The final measure is $$C(p,d)=(\min\{C_{fwd}(p,d),C_{rev}(p,d),\text{Const}\})^2$$

Here Const is used to make the measure more robust.
Static Cues

In this section, how to choose different $V_{p,q}$ for each pair of interacting pixels {p,q} to take advantage of contextual information is described. For simplicity, consider the case of the Potts model, i.e. $V_{p,q}=u_{\{p,q\}}\cdot T(f_p \neq f_q)$. The intensities of pixels in the first image contain information that can significantly influence the assessment of disparities without even considering the second image. For example, two neighboring pixels p and q are much more likely to have the same disparity if it is known that $I(p) \approx I(q)$. Most methods for computing correspondence do not make use of this kind of contextual information.

Contextual information can be incorporated into the framework by allowing $u_{\{p,q\}}$ to vary depending on their intensities $I_p$ and $I_q$. Let $$u_{\{p,q\}}=U(|I_p-I_q|)$$

Each $u_{\{p,q\}}$ represents a penalty for assigning different disparities to neighboring pixels p and q. The value of the penalty $u_{\{p,q\}}$ should be smaller for pairs {p,q} with larger intensity differences $|I_p-I_q|$. In practice, an empirically selected decreasing function $U(\cdot)$ is used. Note that instead of (19) the coefficients $u_{\{p,q\}}$ could also be set according to an output of an edge detector on the first image. For example, $u_{\{p,q\}}$ can be made small for pairs {p,q} where an intensity edge was detected and large otherwise. Segmentation results can also be used.

The following example shows the importance of contextual information. Consider the pair of synthetic images below, with a uniformly white rectangle in front of a black background.;

There is a one pixel horizontal shift in the location of the rectangle, and there is no noise. Without noise, the problem of estimating f is reduced to minimizing the smoothness term $E_{smooth}(f)$ under the constraint that pixel p can be assigned disparity d only if $I_p=I'_{p+d}$.

If $u_{\{p,q\}}$ is the same for all pairs of neighbors {p,q} then $E_{smooth}(f)$ is minimized at one of the labeling shown in the picture below. Exactly which labeling minimizes $E_{smooth}(f)$ depends on the relationship between the height of the square and the height of the background.

Suppose now that the penalty $u_{\{p,q\}}$ is much smaller if $I_p \neq I_q$ than it is if $I_p=I_q$. In this case the minimum of $E_{smooth}(f)$ is achieved at the disparity configuration shown in the picture below. This result is much closer to human perception.

Real Stereo Imagery With Ground Truth

Figure 10:
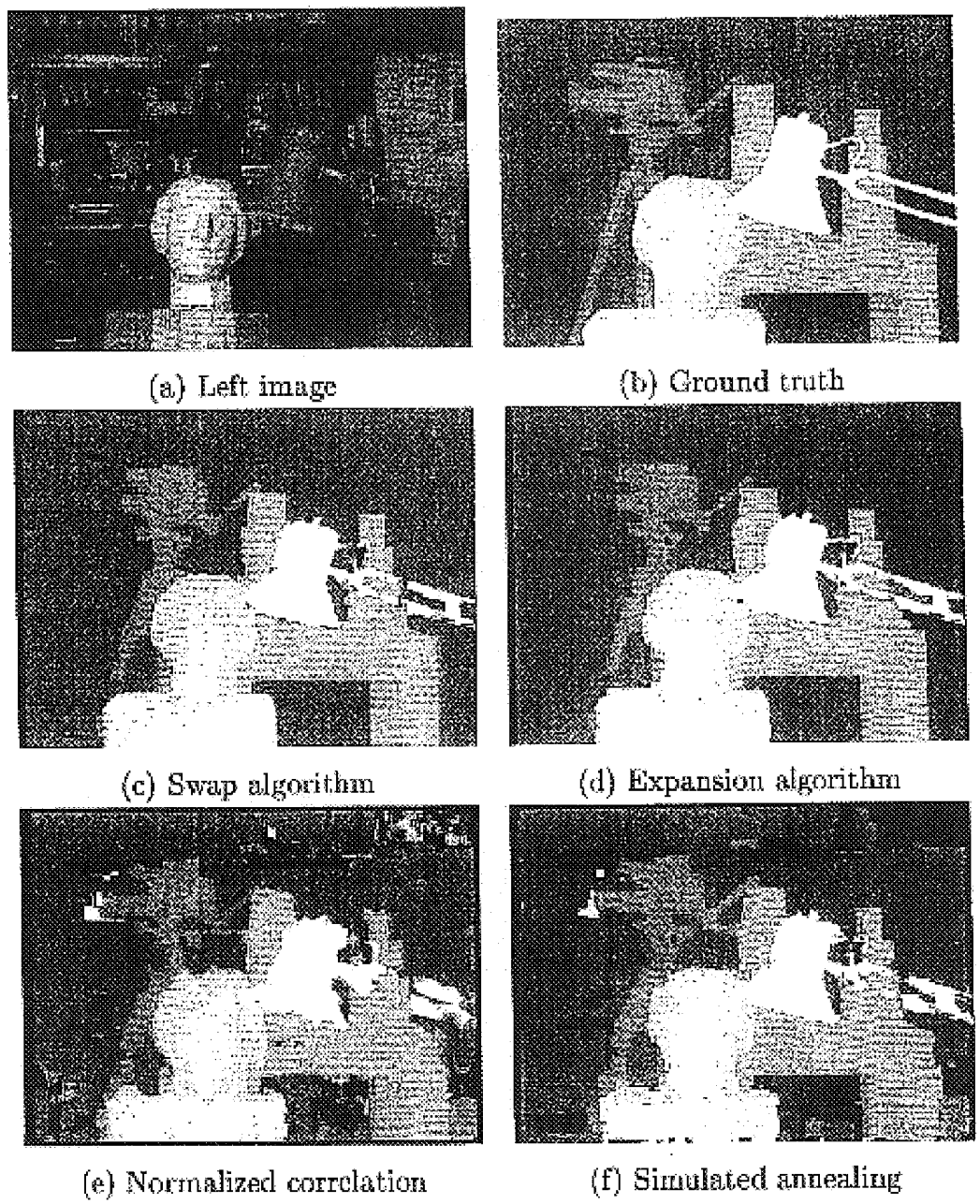
FIGS. 10a, 10b, 10c, 10d, 10e, and 10f show the results from a real stereo pair with known ground truth.

FIG. 10 shows the results from a real stereo pair with known ground truth. The left image of the real stereo pair is shown in FIG. 10(a). FIG. 10(b) shows the ground truth for this stereo pair.

For this stereo pair, $E_P$ was used. The results were compared against annealing and normalized correlation. For normalized correlation, parameters which give the best statistics were chosen. Several different annealing variants were implemented. The one that gave the best performance was used. This was the Metropolis sampler with a linearly decreasing temperature schedule. To give it a good starting point, simulated annealing was initialized with the results from normalized correlation. In contrast, for the algorithms of the present invention, the starting point is unimportant. The results differ by less than 1% of image pixels from any starting point that was tried.

FIGS. 10(c), and (d) show the results of the swap and expansion algorithms for $\lambda$=20. FIGS. 10(e) and (f) show the results of normalized correlation and simulated annealing.

The table below summarizes the errors made by the algorithms. In approximately 20 minutes, simulated annealing reduces the total errors normalized correlation makes by about one fifth and it cuts the number of ±1 errors in half. It makes very little additional progress in the rest of 19 hours that it was run. The expansion, swap, and jump algorithms of the present invention make approximately 3 times fewer ±1 errors and approximately 5 times fewer total errors compared to normalized correlation.

The expansion and swap algorithms of the present invention perform similarly to each other. The observed slight difference in errors is quite insignificant (less than one percent). At each cycle the order of labels to iterate over is chosen randomly. Another run of the algorithms might give slightly different results, where expansion algorithm might do better than the swap algorithm. In general, very slight variation between different runs of an algorithm was observed. However the difference in the running time is significant. On average the expansion algorithm converges 3 times as rapidly as the swap algorithm.

| algorithm | % total errors | % of errors >±1 | running time |
|---|---|---|---|
| expansion algorithm | 7.6 | 2.1 | 106 sec |
| swap algorithm | 7.0 | 2.0 | 300 sec |
| simulated annealing | 20.3 | 5.0 | 1200 sec |
| normalized correlation | 24.7 | 10.0 | 5 sec |

Figures 11, 12:
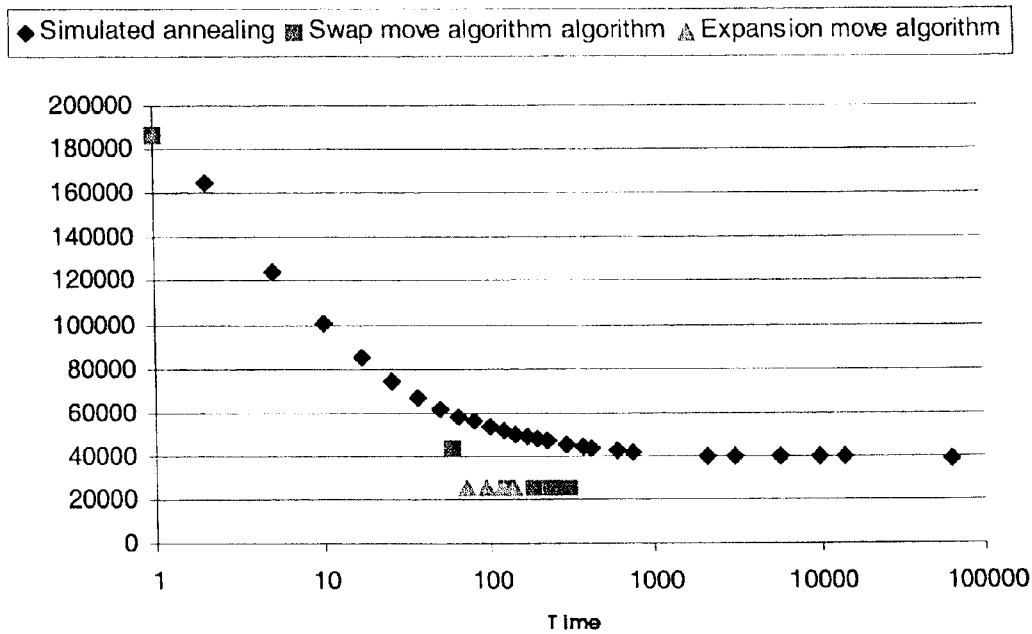
FIG. 11 shows the graph of $E_{smooth}$ versus time for the algorithms of the present invention versus simulated annealing.
FIG. 12 is a table giving the errors made by the expansion algorithm for different choices of λ.

FIG. 11 shows the graph of $E_{smooth}$ versus time for the algorithms of the present invention versus simulated annealing. Notice that the time axis is on the logarithmic scale. The graph for $E_{data}$ is not shown because the difference in the $E_{data}$ term among all algorithms is insignificant, as expected from the following argument. Most pixels in real images have nearby pixels with very similar intensities. Thus for most pixels p there are a few disparities d for which $D_p(d)$ is approximately the same and small. For the rest of d's, $D_p(d)$ is quite large. This latter group of disparities is essentially excluded from consideration by energy minimizing algorithms. The remaining choices of d are more or less equally likely.

Thus the $E_{data}$ term of the energy function has very similar values for the methods of the present invention and simulated annealing he methods of the present invention quickly reduce the smoothness energy to around 16,000, while the best simulated annealing can produce in 19 hours is around 30,000, nearly twice as bad.

The expansion algorithm gives a convergence curve significantly steeper than the other curves. In fact the expansion algorithm makes 99% of the progress in the first iteration.

The algorithms appear to be quite stable in the choice of parameter $\lambda$. For example the table in FIG. 12 gives the errors made by the expansion algorithm for different choices of $\lambda$. For small $\lambda$ the algorithm makes a lot of errors because it overemphasizes the data, for large values of $\lambda$ the algorithm makes a lot of errors because it overemphasizes the prior. However for a large interval of $\lambda$ values the results are good.

SRI Tree Stereo Pair

Figure 13:
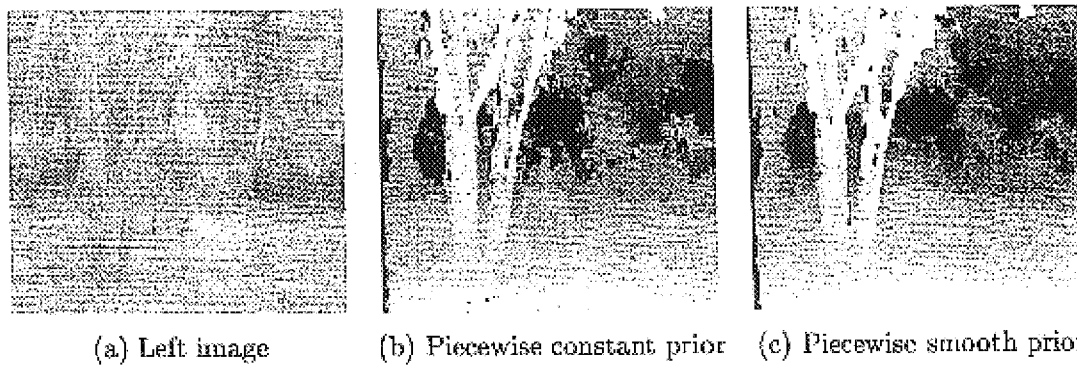
FIG. 13a is the left image of a second stereo pair.
FIG. 13b is the image of FIG. 13a when minimizing $E_P$.
FIG. 13c is the image of FIG. 13a when minimizing $E_L$.

In the well-known SRI stereo pair whose left image is shown in FIG. 13(a) the number of disparities is larger, and $E_P$ does not work as well. FIG. 13(b) and (c) compares the results of minimizing $E_P$ and $E_L$. Notice that there are fewer disparities found in FIG. 13(b), since the piecewise constant prior tends to produce large regions with the same disparity.

Motion

Figure 14:
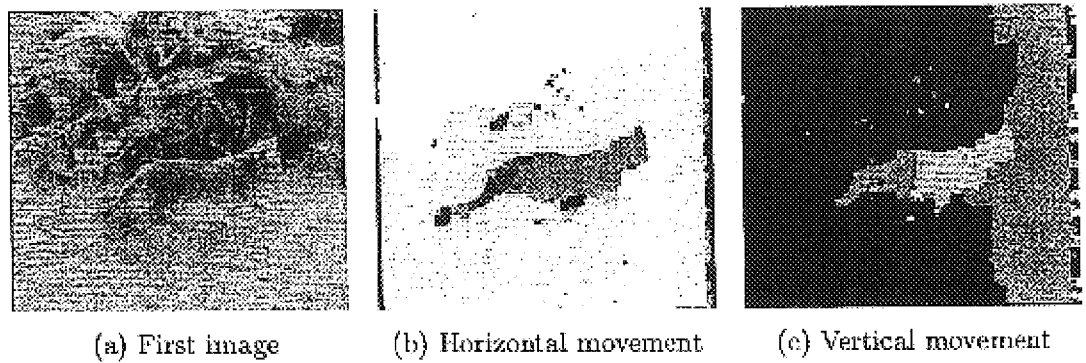

FIG. 14(a) shows one image of a motion sequence where a cat moves against moving background. This is a difficult sequence because the cat's motion is non-rigid. FIGS. 14(b) and (c) show the horizontal and vertical motions detected with the swap algorithm of the present invention. Notice that the cat has been accurately localized. Even the tail and parts of the legs are clearly separated from the background motion.

Figure 15:
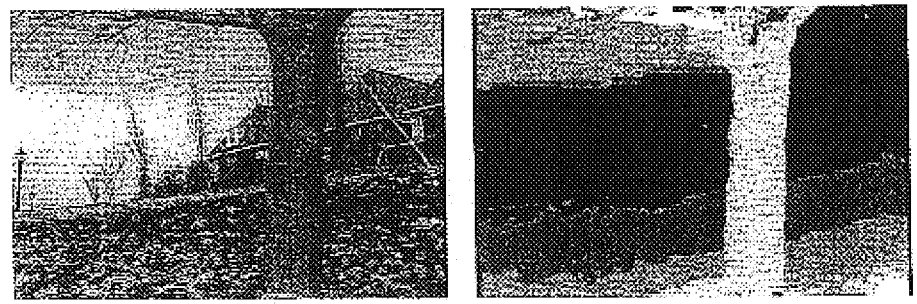
FIG. 15a is another image.
FIG. 15b shows the horizontal motions detected in the image of FIG. 15a using the present invention.

FIGS. 15a and 15b shows the output from the well-known flower garden sequence. Since the camera motion is nearly horizontal, the camera motion was simply delayed. $E_P$ was used to achieve these results.

Bayesian Labeling of Markov Random Fields

In this appendix it is shown that minimization of the energy function in (1) is equivalent to computing the maximum a posteriori estimate of a Markov Random Field (MRF).

Let P be a set of sites, L a set of labels, and N={{p,q}|p, q∈P} a neighborhood system on P. Let $F=F_1, \ldots, F_n$ be a set of random variables defined on P. Each $F_p$ takes values in the label set L. A particular realization of the field will be denoted by $f=\{f_p|p\in P\}$, which is also called a configuration of the field F. As usual, $P(F_p=f_p)$ will be abbreviated by $P(f_p)$. F is said to be a Markov Random Field (MRF) if:

(i) $P(f)>0 \; \forall f\in F$.

(ii) $P(f_p \,|f_{P-\{p\}})=P(f_p|f_{N_p})$ where P−{p} denotes set difference, $f_{N_p}$ denotes all labels of sites in $N_p$, and F denotes the set of all possible labelings.

The easiest way to specify an MRF is by joint distribution. This theorem proves the equivalence between MRFs and Gibbs random fields.

Before defining Gibbs random fields, a clique needs to be defined. A set of sites is called a clique if each member of the set is a neighbor of all the other members. A Gibbs random field can be specified by the Gibbs distribution:

$$P(f) = Z^{-1} \cdot \exp\left(-\sum_{c \in C} V_c(f)\right),$$

where C is the set of all cliques, Z is the normalizing constant, and $\{V_c(f)\}$ are functions from a labeling to non-negative reals, called the clique potential functions.

Thus to specify an MRF, the clique potential functions need to be specified. A first order MRF is considered, which means that for all cliques of size larger than two the potential functions are zero, and for the cliques of size two the potential functions are specified by $$V_c(f)=V_{p,q}(f_p,f_q).$$

This defines an MRF with the joint distribution:

$$P(f) = Z^{-1} \cdot \exp\left(-\sum_{\{p,q\}\in N} V_{p,q}(f_p, f_q)\right)$$

In general, the field F is not directly observable in the experiment. A popular way to estimate its realized configuration f̂ based on an observation d is the maximum a posteriori (MAP) estimation. Using Bayes rule, the posterior probability can be written as $$p(f \mid d) = \frac{p(d \mid f)p(f)}{p(d)}$$

Thus the MAP estimate f* is equal to $$\arg \max_{f\in F} p(d \mid f)p(f) = \arg \min_{f\in F} (-\log p(d \mid f)p(f))$$

Assume that he observation $d_p$ at each pixel is independent and that $$p(d_p|l)=C_p \cdot \exp(-D_p(l)) \text{ for } l\in L,$$

where $C_p$ is the normalizing constant, and $D_p$ was defined in Section 1. Then the likelihood can be written as $$p(d \mid f) \propto \exp\left(-\sum_{p\in P} D_p(f_p)\right)$$

Writing out p(d) and p(d|f) with the above assumptions results in $$f^* = \arg \max_{f\in F} \sum_{\{p,q\}\in N} V_{p,q}(f_p, f_q) + \sum_{p\in P} D_p(f_p)$$

which is the general form of the energy function being minimized.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A process for determining an optimal labeling of pixels in early vision, comprising the steps of:

a) providing an initial solution having a plurality of labels, wherein each pixel from a plurality of pixels has a corresponding pixel label from the plurality of labels;

b) forming a graph from said initial solution, said graph comprised of nodes and of edges connecting said nodes, each said pixel having a corresponding node;

c) selecting a move from said graph, wherein said move comprises assigning a new corresponding pixel label to at least one pixel from said plurality of pixels;

d) assigning a weight value to each said edge of said;

e) determining a minimum graph cur in response to said assigned weights, wherein a graph cut comprises a subset of said edges; a minimum graph cut having a smallest value of a cost;

f) forming a graph from results of said minimum graph cut; and g) repeating steps c–f until predetermined criterion is reached.

2. The process of claim 1 wherein said move is a label pair in an α-β swap; wherein said α-β swap comprises assigning a label a to a subset of said pixels, said subset having at least one pixel and any pixel from said subset having had a label b before said α-β swap.

3. The process of claim 1 wherein said move is a label in an α-expansion; wherein said α-expansion comprises assigning a label a to a subset of said pixels, aid subset having at least one pixel.

4. The process of claim 1 wherein step g) further comprises repeating steps c–f until no improvements to said labels can be made.

5. The process of claim 1 wherein said predetermined criterion comprises reaching an acceptable solution.

6. The process of claim 1 wherein said predetermined criterion comprises obtaining a substantially minimum cost.

* * * * *

UNITED STATES PATENT AND TRADEMARK OFFICE
CERTIFICATE OF CORRECTION

PATENT NO. : 6,744,923 B1
DATED : June 1, 2004
INVENTOR(S) : Zabih et al.

It is certified that error appears in the above-identified patent and that said Letters Patent is hereby corrected as shown below:

Column 22,
Lines 46-47, "said graph comprised" should read -- said graph being comprised --;
Line 53, "said;" should read -- said graph; --;
Line 54, "graph cur" should read -- graph cut --;
Line 61, "until predetermined" should read -- until a predetermined --; and Column 23,
Line 3, "aid subset" should read -- said subset --.

Signed and Sealed this

Seventeenth Day of August, 2004

JON W. DUDAS
*Acting Director of the United States Patent and Trademark Office*